United States Patent
Buzuloiu et al.

(10) Patent No.: US 6,751,348 B2
(45) Date of Patent: Jun. 15, 2004

(54) AUTOMATED DETECTION OF PORNOGRAPHIC IMAGES

(75) Inventors: Vasile Buzuloiu, Bucuresti (RO); Mihai Cuic, Bucuresti (RO); Razvan Beuran, Thoiry (FR); Horia Grecu, Bucuresti (RO); Alexandru Drimbarean, Co. Galway (IE); Peter Corcoran, Cregg (IE); Eran Steinberg, San Francisco, CA (US)

(73) Assignee: Fotonation Holdings, LLC, Peterborough, NH (US)

( * ) Notice: Subject to any disclaimer, the term of this patent is extended or adjusted under 35 U.S.C. 154(b) by 473 days.

(21) Appl. No.: 09/823,139

(22) Filed: Mar. 29, 2001

(65) Prior Publication Data

US 2002/0159630 A1 Oct. 31, 2002

(51) Int. Cl.⁷ .............. G06K 9/00; G06K 9/40; G06K 9/62; G06K 9/68
(52) U.S. Cl. ............ 382/165; 382/260; 382/218; 382/224
(58) Field of Search ............ 382/162, 164, 382/165, 117, 118, 133, 203, 218, 224, 225, 250, 253, 260, 276, 285, 287, 291, 306; 709/224, 229

(56) References Cited

U.S. PATENT DOCUMENTS

| | | | | |
|---|---|---|---|---|
| 5,987,611 A | * | 11/1999 | Freund | 713/201 |
| 6,065,056 A | * | 5/2000 | Bradshaw et al. | 709/229 |
| 6,266,664 B1 | * | 7/2001 | Russell-Falla et al. | 707/5 |
| 6,345,283 B1 | * | 2/2002 | Anderson | 707/205 |
| 6,389,472 B1 | * | 5/2002 | Hughes et al. | 709/229 |
| 6,407,777 B1 | | 6/2002 | DeLuca | 348/576 |
| 6,446,119 B1 | * | 9/2002 | Olah et al. | 709/224 |
| 6,650,777 B1 | * | 11/2003 | Jensen et al. | 382/203 |
| 6,654,067 B1 | * | 11/2003 | Mc Gee et al. | 348/700 |
| 2002/0126893 A1 | | 9/2002 | Held et al. | 382/167 |
| 2002/0136450 A1 | | 9/2002 | Chen et al. | 382/165 |

* cited by examiner

Primary Examiner—Andrew W. Johns
Assistant Examiner—Amir Alavi
(74) Attorney, Agent, or Firm—Sawyer Law Group LLP

(57) ABSTRACT

A method of detecting pornographic images, wherein a color reference database is prepared in LAB color space defining a plurality of colors representing relevant portions of a human body. A questionable image is selected, and sampled pixels are compared with the color reference database. Areas having a matching pixel are subjected to a texture analysis to determine if the pixel is an isolated color or if other comparable pixels surround it; a condition indicating possible skin. If an area of possible skin is found, the questionable image is classified as objectionable. A further embodiment includes preparation of a questionable image reference shape database defining objectionable shapes. An image with a detected area of possible skin is compared with the shape database, and depending on the results of the shape analysis, a predefined percentage of the images are classified for manual review.

22 Claims, 13 Drawing Sheets

$$V = \frac{\sum_1^P \sqrt{colour^2}}{P}$$

V is variance
P is number of pixels $$colour^2 = (L - mean\ L)^2 + (a - mean\ a)^2 + (b - mean\ b)^2$$

$$mean\ L = \frac{\sum_1^P L}{P} \qquad mean\ a = \frac{\sum_1^P a}{P}$$

$$mean\ b = \frac{\sum_1^P b}{P}$$

$V \geq 10 \Rightarrow$ not skin
$V < 10 \Rightarrow$ skin $$V = \frac{\sum_{1}^{P} \sqrt{\text{colour}^2}}{P}$$

V is variance
P is number of pixels $$\text{colour}^2 = (L - \text{mean } L)^2 + (a - \text{mean } a)^2 + (b - \text{mean } b)^2$$

$$\text{mean } L = \frac{\sum_{1}^{P} L}{P} \qquad \text{mean } a = \frac{\sum_{1}^{P} a}{P}$$

$$\text{mean } b = \frac{\sum_{1}^{P} b}{P}$$

$V \geq 10 \Rightarrow$ not skin
$V < 10 \Rightarrow$ skin

AUTOMATED DETECTION OF PORNOGRAPHIC IMAGES

BACKGROUND OF THE INVENTION

1. Field of the Invention

The present invention relates generally to methods of detecting pornographic images transmitted through a communications network, and more particularly to a detection method wherein pixels of a questionable image are compared with a color reference database and an area surrounding a questionable image is subjected to a texture analysis, and images with questionable areas are subjected to a shape analysis.

2. Description of the Prior Art

A variety of methods have been used to deter the display of "objectionable" images in a work site. "Pornographic-free" web sites, such as sites targeting families and children have been set up for shielding children from viewing objectionable material. Although a particular site may be pornographic free, and considered acceptable for access by children, it is still possible to gain access to an objectionable web site by starting from an acceptable site. Software applications and Internet services such as Net-Nanny and Cyber-Sitter were created and marketed to help parents prevent their children from accessing objectionable documents by blocking access to specific web sites. One type of protective software is designed to store the addresses of objectionable web sites, and block access to these sites. Another type of protective software blocks access to all "unapproved" sites from within a limited selection of sites. These approaches are not highly effective because it is a practical impossibility to manually screen all of the images on all of the web sites that are added each day to the web. They rely on either storing a local database of website URLs, or referencing the database on the Internet. Many next-generation Internet terminals for the consumer market have limited local storage capability and cannot store the database locally. Where the database is referenced on the Internet, there are two disadvantages: (i) the database must be referenced before each Web page is displayed, causing a significant delay to the display of web pages on a browser and (ii) there is a significant increase in the network bandwidth used by such an Internet terminal because of these database lookups. Various algorithms have been investigated for use in detecting objectionable media. For example, algorithms have been tested for use in recognizing shapes, such as people in general, and specific body parts. A detailed summary of work done with algorithms is found in David A. Forsyth and Margaret Flich, Finding Naked People, Journal Reviewing, 1996 and Margaret Flich, David A. Forsyth, Chris Bregler, Finding Naked People, Proceedings of 4th European Conference on Computer Vision, 1996; and David A. Forsyth et al., Finding Pictures of Objects in Large Collections of Images, Proceedings, International Workshop on Object Recognition, Cambridge, 1996.

In order for an algorithm to be useful for screening objectionable images, it is necessary for the algorithm to achieve a very high ratio of the number of objectionable images correctly identified to the total number of objectionable images in a database. This ratio will be referred to as the "recall", or otherwise referred to as positive identification. In addition, in order for a system to be useful, it should not mis-classify non-objectionable images and therefore generate what is referred to as "precision" or "false-alarm".

A perfect system will have full positive identification (100% of images that are suspicious will be flagged) and 100% precision (no images that are not objectionable will be flagged). Of course, no system can be perfect. It is therefore a balancing act to try and maximize the positive identification while not over loading the system with false alarms. However, it is important to note that when only a small fraction of the images are objectionable, it is highly important to maximize positive identification, even if the false alarm percentage increases.

One algorithm system reported by Forsyth had a 43% recall with a 57% precision. According to this report it took about 6 minutes of analysis per image to determine if an image pre-selected by a skin filter was an image of a person. In perspective, for a web site that handles 100,000 images per day, such percentages may mean that many images may not be detected and therefore, the algorithm may not be useful.

SUMMARY

It is an object of the present invention to provide an accurate and computationally efficient method of detecting images that may contain pornographic material.

It is a further object of the present invention to provide an accurate and efficient method of detecting images that contain faces for facial recognition purposes.

Briefly, a preferred embodiment of the present invention includes a method of detecting pornographic images, wherein a color reference database is prepared in Luminance-Chrominance space such as the L*a*b* color space, defining a plurality of colors representing relevant portions of a human body. A questionable image is selected, and sampled pixels are compared with the color reference database. The surrounding areas having a matching pixel within accepted variability are subjected to a texture analysis to determine if the pixel is an isolated color or if other comparable pixels surround it; a condition indicating possible skin. If an area of possible skin is found, the questionable image is classified as objectionable. A further embodiment includes preparation of a questionable image reference shape database defining objectionable shapes. An image with a detected area of possible skin is compared with the shape database, and depending on the results of the shape analysis, a predefined percentage of the images are classified for manual review.

An advantage of the present invention is that it provides a more accurate method of detecting pornographic images.

An advantage of the present invention is that it provides a practical method for detecting, classifying and marking images which are suspected as indecent.

A further advantage is that due to its computational efficiency, the invention can screen large volumes of images at speeds close to or equal to real time and block them from being viewed immediately.

A still further advantage of the present invention is that due to a multiple detection criteria, the system can reach a low false negative rate.

Another advantage of the present invention is that due to its ability to not only add images but eliminate images the system has a low rate of false positive detection.

Another advantage of the present invention is that it provides a method offering greater speed of detection of pornographic images.

A still further advantage of the method of the present invention is that it can be implemented on the client side as with an extension of a browser application.

IN THE DRAWING

DETAILED DESCRIPTION OF THE PREFERRED EMBODIMENTS

Figure 1:
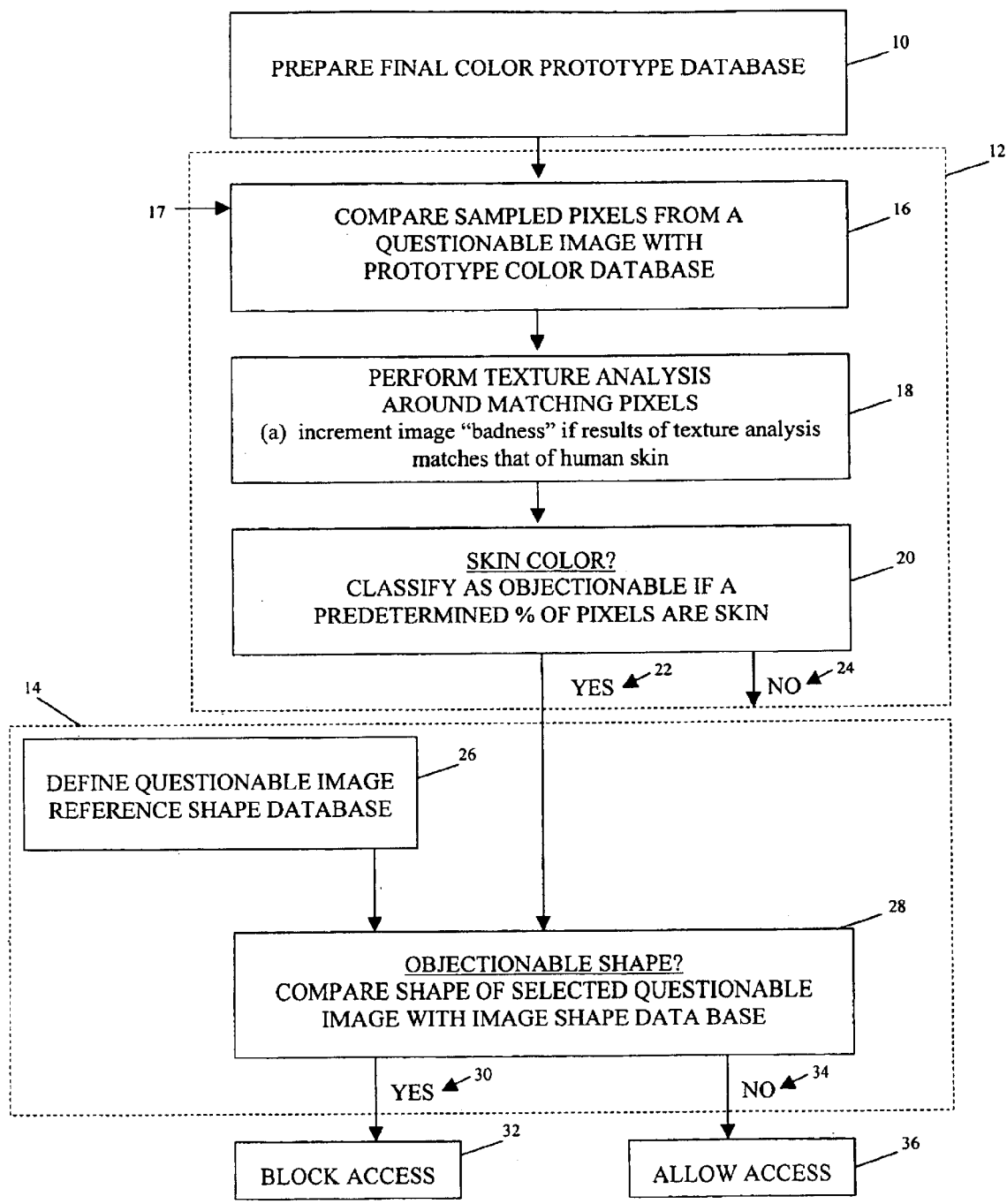
FIG. 1 is a flowchart illustrating the method of the present invention.

The method of the present invention applies to the detection of pornographic images transmitted over a communications network, and includes both single or still images, and collections of images used in motion pictures/video presentations. FIG. 1 is a flow chart illustrating the method, including preparation of a final color prototype database 10 based on analysis of collected objectionable images, color detection 12 and shape detection 14. Preparation of the color prototype database will be described in detail in the following text in reference to FIG. 3. Once the prototype database is established, the color detection step 12 proceeds as follows.

According to block 16, color detection begins by sampling pixels from a questionable image, the reception of which is indicated by input 17, and compares the color of each sampled pixel with the colors in the color prototype database. When a pixel is found to match a color in the color prototype database, a texture analysis is performed in an area around the questionable pixel (block 18). If the area around the pixel is uniform in color within a pre-determined variance, the area is considered to be potentially skin, and a quantity defined as "image badness" is incremented. This process is done for each of the sampled pixels. According to block 20, if a predetermined percentage of the sampled pixels are determined to be possible skin i.e., if the "image badness" is above a threshold level, the image is classified as objectionable 22. If the "badness" is below the threshold 24, the image is not considered objectionable. Note that the variance of the surrounding pixels is used as a measure of skin texture. However, it is not intended that the present invention should be limited to this method of texture measurement. Other techniques of texture measurement such as co-occurrence, Gabor filtering, or Fourier Transform based techniques which are known to those skilled in the art, may equally well be applied as a method of determining skin texture.

The shape detection method 14 involves first establishing a shape database 26. Images that are determined at step 20 to include skin 22, are compared (block 28) with the image shapes in database 26. If the image shape matches (within a predetermined tolerance) an image in the shape database 30, the image is determined to be objectionable. This result could then be applied by blocking access to the image 32. If the image does not match a shape in the shape database (34), access to the image may be allowed (block 36). Various shape detection algorithms have been described in the prior art. Those skilled in the art will therefore know how to implement the shape detection 14 as applied in the present invention upon reading the present disclosure. Details concerning the method of shape detection are therefore not needed.

Figure 2:
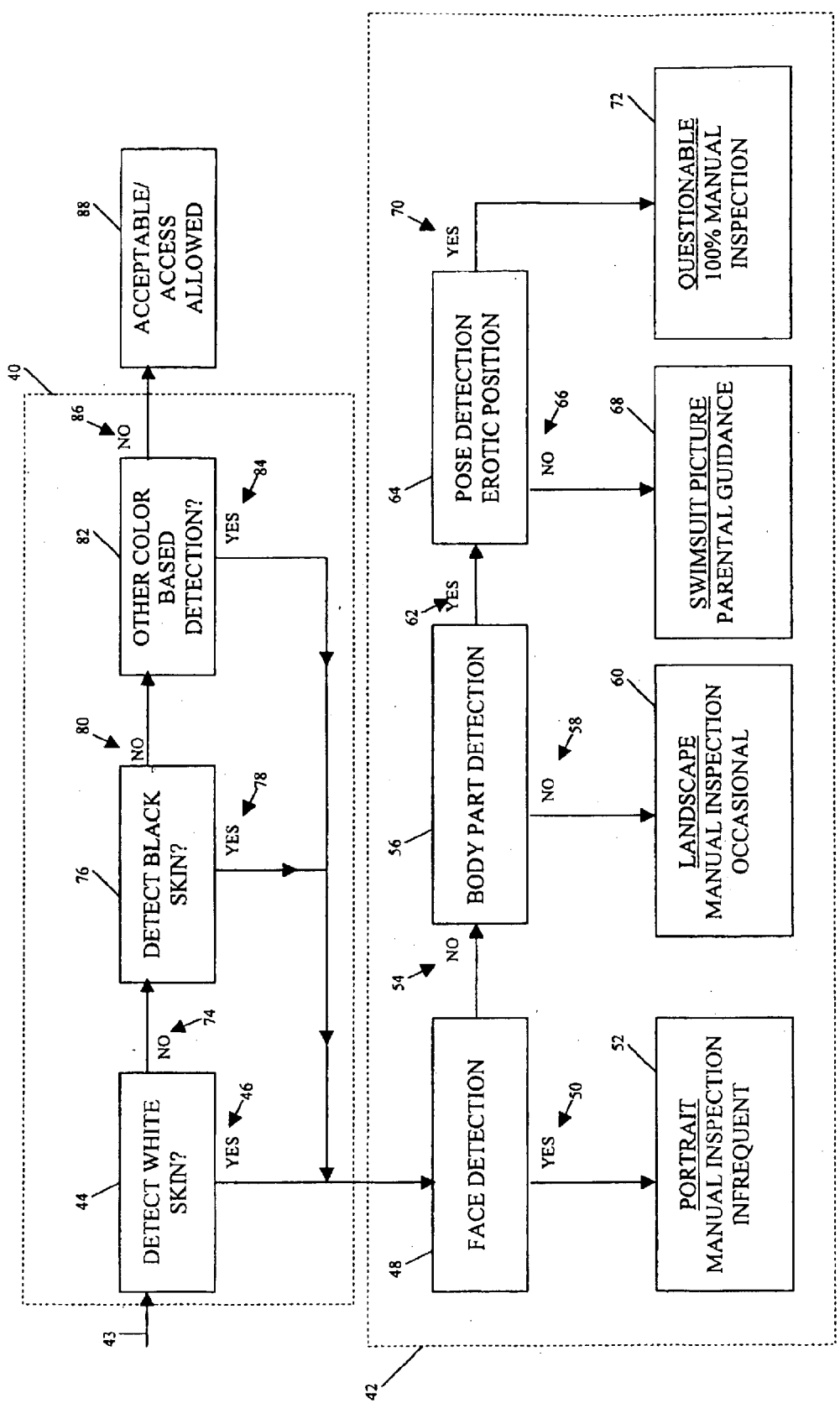
FIG. 2 illustrates the method of the present invention embodying a plurality of color detectors and shape detection steps.

FIG. 2 of the drawing illustrates an alternate embodiment of the color detection and shape detection steps of the present invention. A color detection process 40 includes a series of steps, each similar to steps 10 and 12 of FIG. 1 with each detection step (44, 76 and 82) focussing on a particular color type. A shape detection process 42 includes separate shape detection steps 48, 56 and 64, each similar to the shape detection 14 of FIG. 1. Each process (48, 56, 64) is for a different type of shape. Input 43 represents the reception/selection of a questionable image that needs to be analyzed. Block 44 represents the detection of a particular color type, such as "white" and involves the operations of blocks 10 and 12 as described in FIG. 1. If the pixel color is determined to be "skin" 46, the image is sent to a first shape detection process indicated for example as "face detection" of block 48 wherein steps similar to blocks 26 and 28 of FIG. 1 are performed. If the image is detected as a "face" 50, the image is classified as "portrait" and a manual check/inspection is done only infrequently (block 52). If the image is not a "face" 54, the image is analyzed to determine if it is a body part (block 56) i.e., other than a face. If it is not a body part (58), the image is classified as a "landscape", and this type is only inspected occasionally (block 60) i.e. only a small percentage of these images are inspected manually. If the image is a body part (62), a pose detection is done to determine if there is an erotic position (block 64). If it is determined that the pose is not erotic (66), this image is classified as a "swim suit picture" and the result of the detection may be a "parental guidance" notice attached (block 68). If the pose detection 64 indicates that the image is erotic 70, it is classified as objectionable and 100% manual inspection is required prior to allowing access (block 72).

Referring back to the first detection step of block 44, if the color is not detected as skin (74), a second color detection process (block 76) is applied to detect another color category, for example "black" skin. If "black" skin is detected 78, the image is sent to the shape detection process 42 as explained above. If the color is not "black" skin 80, the color detection process can continue, focussing on another color (82). Although FIG. 2 shows only three color blocks, 44, 76 and 82, any number of color types can be analyzed as required. If the "other" color is detected 84, the image is sent to the shape detection process 42. If no skin color is detected 86, the image is classified as acceptable for access (block 88).

Figure 3:
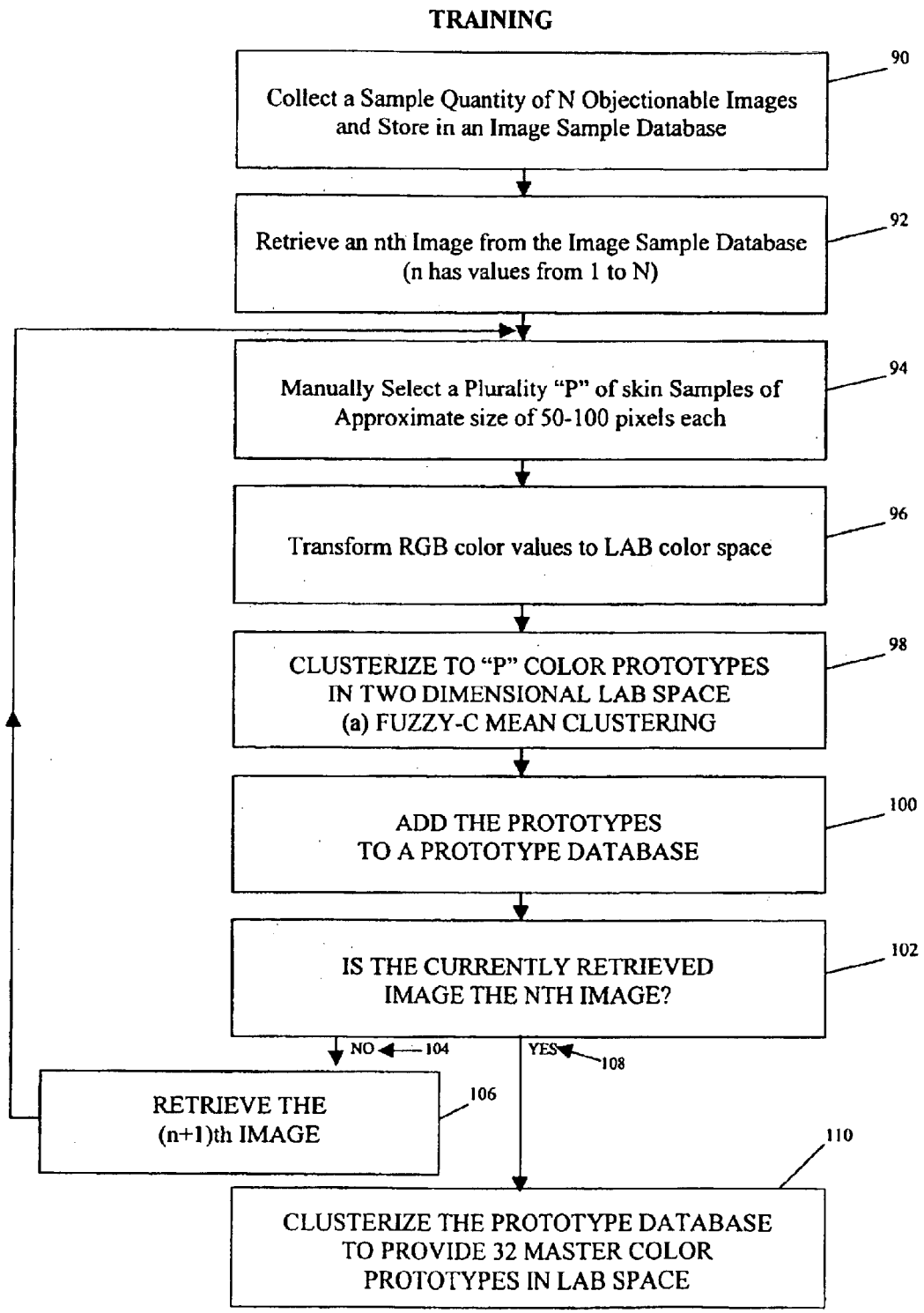
FIG. 3 is a flowchart describing the process of determining a final prototype database.

Referring now to FIG. 3 of the drawing, a flow chart shows various steps involved in the process of block 10 of FIG. 1. This process is also included in the detection processes 44, 76 and 82 of FIG. 2, since a database of reference colors is necessary in order to detect a skin color. According to step 10 of FIG. 1, a database of defined colors corresponding to human body parts is established as a reference to compare with pixels from questionable images.

FIG. 3 is a flow chart defining the steps of the process of block 10. The first step (block 90) includes collecting a quantity of N known objectionable images and storing them in a sample database. In step 92, one of the "N" images is retrieved from the sample database. In step 94, a plurality of "P" skin samples are selected at random from the image. Each skin sample is preferably selected to have about 50–100 pixels. The number of skin samples and pixels in a sample is somewhat arbitrary and the present invention includes any number. Eight samples of 50–100 pixels each are preferred because these quantities are adequate for an excellent definition of the color, and the quantity is small enough so as not to require excessive computer processing time. According to the method, the next step 96 transforms the pixel color data from the typical RGB digital color data type to what is known as LAB color space. The use of LAB color space in the detection of skin color is advantageous in that it allows the required color space to be reduced from three dimensions to two dimensions. This will be explained in detail in the following text of the specification.

Step 98 assigns a color center value to each of the eight samples. This is done in two dimensions in LAB space by deleting the "luminance" coordinate and thereby simplifying and accelerating the speed of calculations. This defining of groups is known as "clustering". The area of each sample/cluster group is defined by an ellipse extending from the center color value in LAB space. (Note that the optimum choice of a radius for detection purposes is obtained through empirical testing and observations. For our preferred embodiment we have found an optimum choice of radius for each color prototype to lie close to 4.0 in LAB space. Also note that the A co-ordinates extend from −96 to +90; the B co-ordinates extend from −113 to 88.9 and the L co-ordinate from 0 to 100.) There are a few methods of clustering known to those skilled in the art. Among these is one known as the Fuzzy C-Means algorithm. The Fuzzy C-Means method allows for overlapping clusters. In applying this algorithm to the present invention, an individual pixel may have a percentage "membership" in a particular group; for example, 80% could be in group A and 20% in group B. The eight sets of group/cluster color data, each including a center value and radius, is then added to a prototype color reference database (block 100) that is used in determining a final color prototype database for comparative reference to determine if a pixel from a questionable image is a skin color. The system then checks to determine if the currently analyzed image is the last image i.e. the Nth image (block 102). If it is not the Nth image (104), then another image from the sample database is selected (block 106). Steps 94–102 are then repeated. If the currently evaluated image is the last one i.e. the Nth image (108), then the clusters of data in the database as described above are further clustered to reduce the total number of color clusters to a quantity of 32 (block 110). For example, a total of 100 sample images may be collected and placed in the image sample database. A selection of 8 skin samples from each of the 100 images yields a total of 800 clusters in the prototype database. This is generally too many for rapid processing with current technology. The second clustering of step 110 reduces this set of 800 to a set of 32, each set with a center color value and, of course, a larger radius that encompasses a number of the 800 original clusters. The choice of 32 is somewhat arbitrary, and the present invention also includes other quantities.

Figure 4:
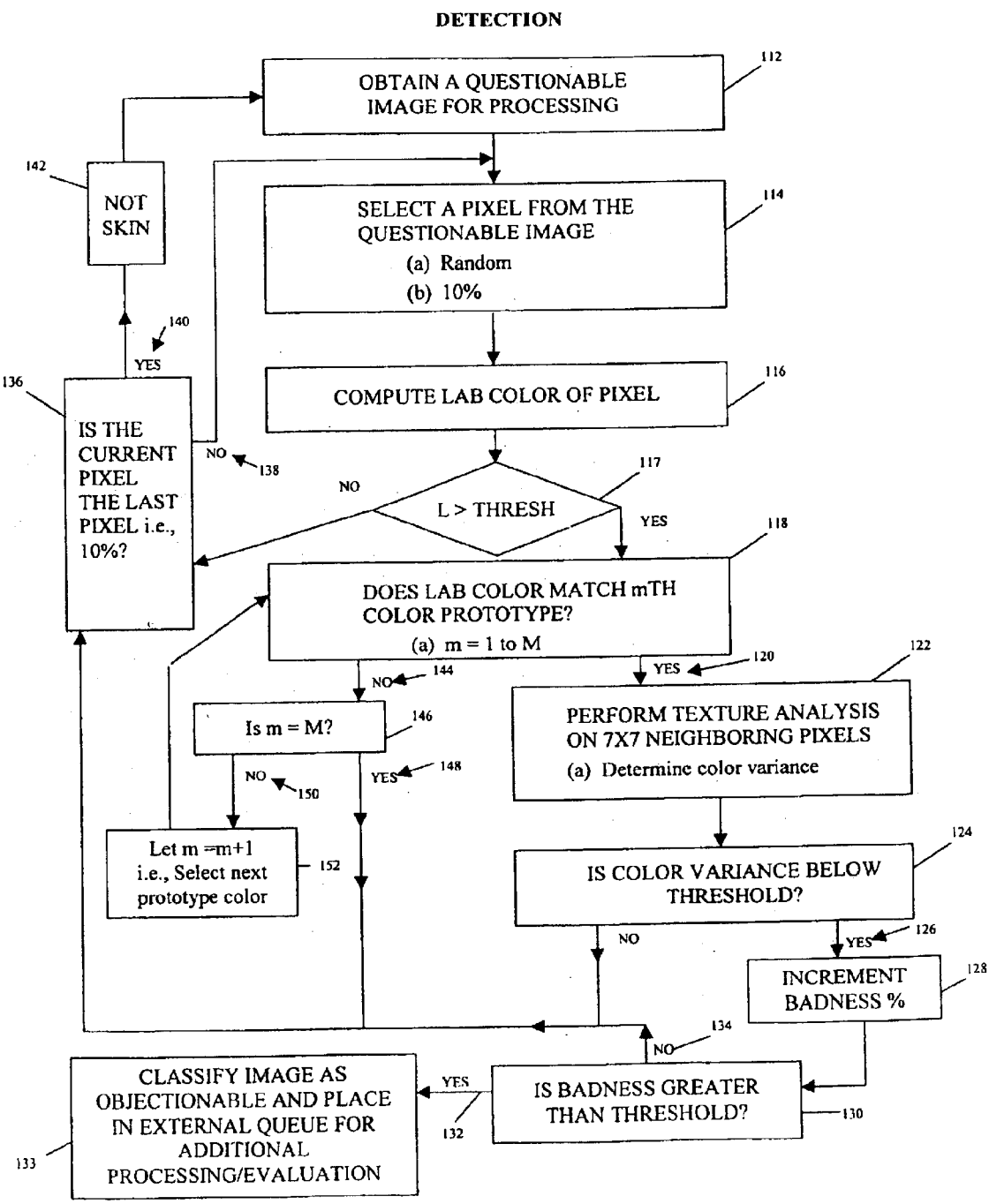
FIG. 4 is a flowchart for description of the method of detecting an objectionable image.

The detection step 10 of FIG. 1, and in each of the steps 44, 76 and 82 of FIG. 2, is illustrated in more detail in FIG. 4 of the drawing. Block 112 represents the input of a questionable image, corresponding to input 17 of FIG. 2, and storage of a buffered backlog of images waiting for analysis, and the reception of the image or retrieval of the image from the buffer as required in order to obtain the questionable image for processing. Step 114 includes selecting pixels at random from the questionable image data. Only a sampling is taken in order to minimize the time required for analysis. A typical sampling would be 10% of the image pixels, but other quantity/percentages are also included in the spirit of the present invention. The process selects one pixel at a time. The pixel is generally received in a data format known as RGB color space. As discussed above, this is transformed/converted into a three dimensional LAB color space. If the value of the luminance is less than a certain threshold, then the pixel is classified as non-objectionable without further color matching. The value of this threshold depends on the skin type being matched and is determined empirically by observation. For white, Caucasian skin, an optimum value of the luminance is 60. For darker skin-types the threshold will be lower.

If the value of the luminance is greater than the threshold value for the skin type being matched the luminance coordinate is dropped (block 116). The selected pixel color is then compared with a first of the M color prototypes from the prototype database (block 118). If the pixel matches the prototype color (120), a texture analysis is performed (block 122) to determine if the pixel is from an area of skin, or from some other material such as desert sand, etc. The texture analysis is based on the fact that if the area is skin, the immediately adjacent pixels will generally be of similar or the same color. If it is some other material, there will usually be a greater variation in color. This analysis involves retrieving the pixel data from an area around the pixel in question. For example, an area of 7×7 pixels is a preferred number, with other areas also included in the spirit of the present invention. A number called "color variance" is calculated which corresponds to the degree of difference in color between the pixel in question and the surrounding pixels. The process then determines if the color variance is below a pre-determined reference threshold number (block 124). If it is below the threshold (126), a value called image badness is incremented (block 128). If the image badness % is greater than a threshold value (132), which may be typically, varied from 10% to 30% of sampled pixels depending on the strictness of the required detection, then the image color is classified as skin/objectionable and is placed in a queue for additional processing/evaluation (block 133). This, as explained above, will generally be a shape detection analysis and/or a manual inspection. If the badness is not greater than the threshold 134, the method determines if the current pixel being calculated is the last pixel in the sampling i.e. for example 10% of image pixels (block 136). If it is not the last pixel (138), the process continues at block 114 with selecting another pixel, etc. If the pixel is the last of the sampling (140), then the image is passed as not being skin color (block 142), and another image can be selected for analysis (block 112), etc. Returning to block 118, if the selected pixel does not match the mth color prototype (144), the method determines if the current prototype is the last ("Mth") prototype (block 146). If it is the last prototype (148), the method proceeds to block 136 to either select the next pixel or declare that the image is not skin (block 142), etc. If the current prototype being compared is not the last prototype (150), the next prototype is selected (block 152) and the current pixel is compared with that prototype (block 118), etc.

Figure 5:
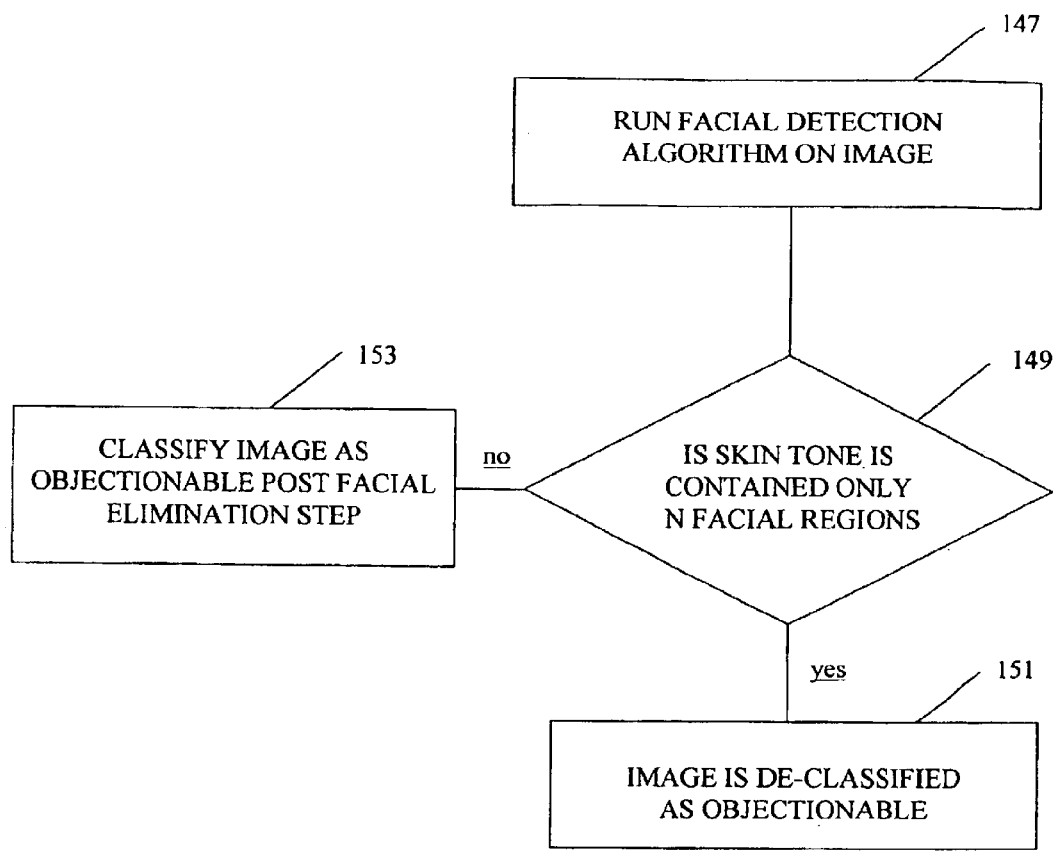
FIG. 5 is a flow chart illustrating facial elimination.

The process of determining whether an image is questionable or not includes an additional important stage which is an elimination step as described in FIG. 5. In this figure, skin tone regions of the images are being segmented and marked as described in Block 147. If the image contains any skin regions that are facial as described in block 149 then the image can be de-classified and eliminated from the suspected queue (block 151). If the image skin tones are not limited to the facial area, the image is classified as objectionable 153.

Figure 6:
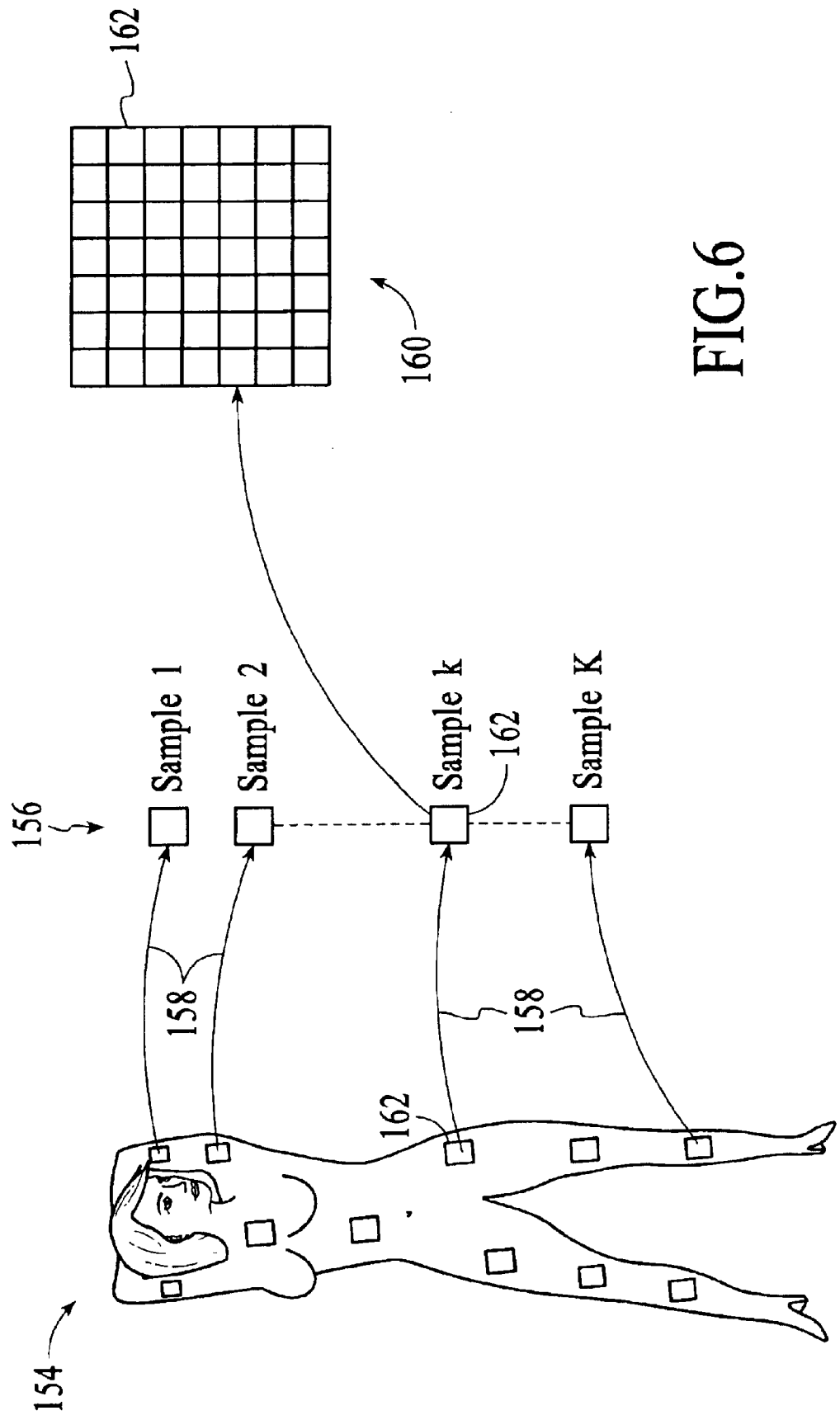
FIG. 6 illustrates selecting samples from an image.

The process of preparing the prototype color database will now be described in further detail in reference to FIGS. 6–9 of the drawing. The prototype database was described above in reference to block 10 of FIG. 1, and then in more detail in reference to the flow chart of FIG. 3. Referring now to FIG. 6, an image 154 is shown as an image retrieved from the database of known objectionable images. The image database was described in reference to block 90 of FIG. 3, and retrieving an image 154 was described in reference to block 92 of FIG. 3. A plurality K of skin samples 156 are then manually selected from the image 154 as described in reference to block 94 of FIG. 3. The selecting of samples is represented in FIG. 6 by arrows 158. The preferred quantity of samples K is between 8 and 20, although other quantities are also included in the spirit of the present invention. Each sample 156 preferably includes between 50 and 100 pixels. Other quantities are also included in the spirit of the present invention. The plurality of pixels in a sample is symbolically represented by grid 160 for the kth sample 162.

Figure 7:
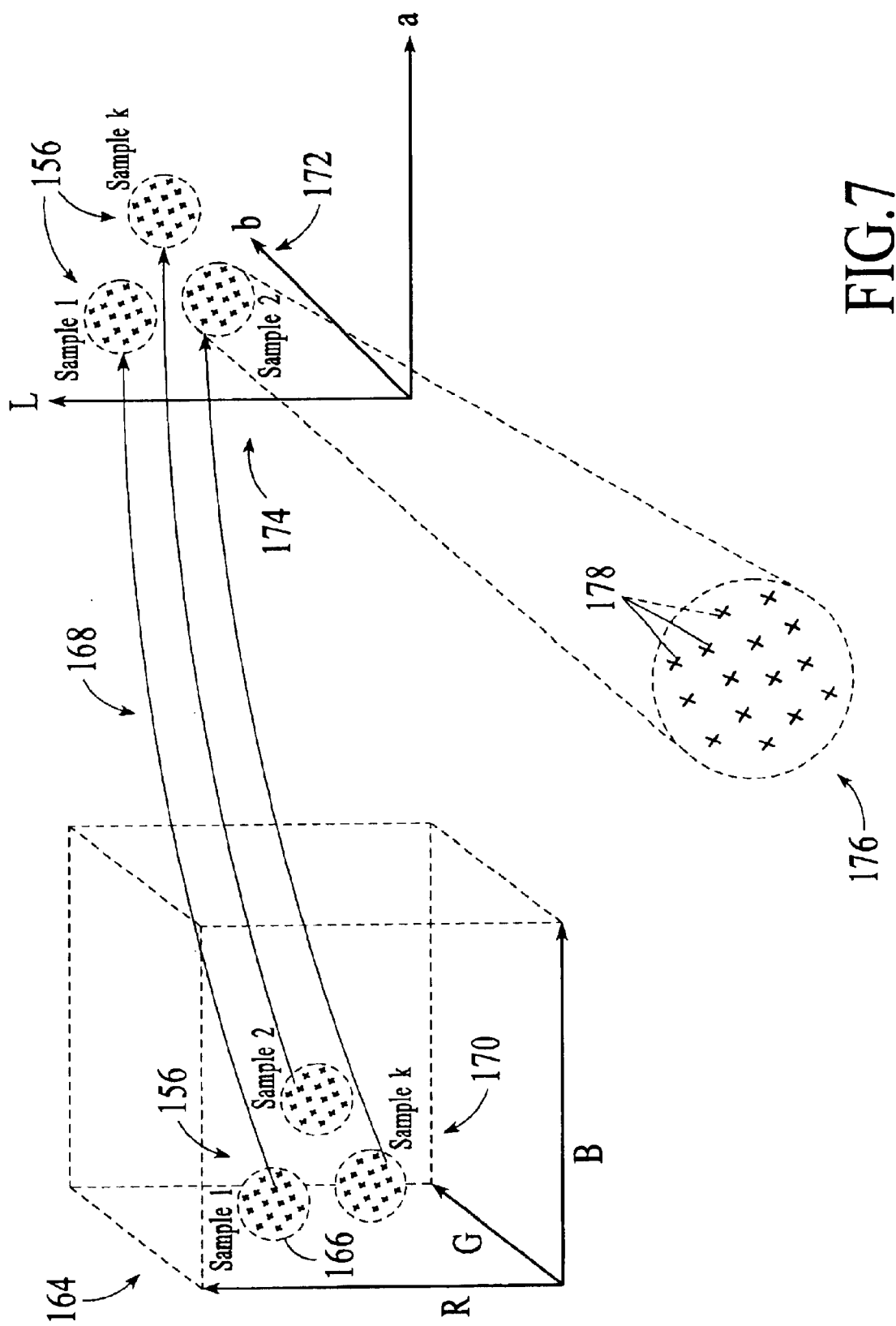
FIG. 7 illustrates the conversion from RGB color space to LAB color space.

The color data for each pixel is usually represented in RGB digital color space for a received image 154. According to the present invention, the color data is converted from RGB color space to LAB color space as described in reference to block 96 of FIG. 3. This is illustrated in FIG. 7. Coordinate system 164 represents the pixels 166 of the samples 156 in RGB color space. Only three of the K samples are symbolically illustrated for clarity.

FIG. 7 illustrates the conversion from RGB to LAB space, with arrows 168 pointing from the RGB pixel data 170 to the LAB data 172 for samples 156 in the LAB coordinate system 174. This conversion is described above in reference to block 96, of FIG. 3. An expanded view 176 is symbolically illustrated for showing individual pixels 178. In the LAB coordinate system/space 174, coordinate "L" is luminance, coordinate "b" represents the yellow-blue spectrum, and coordinate "a" represents the red-green spectrum. The standard hue and chroma color values are derived from the "a" and "b" values.

Figure 8:
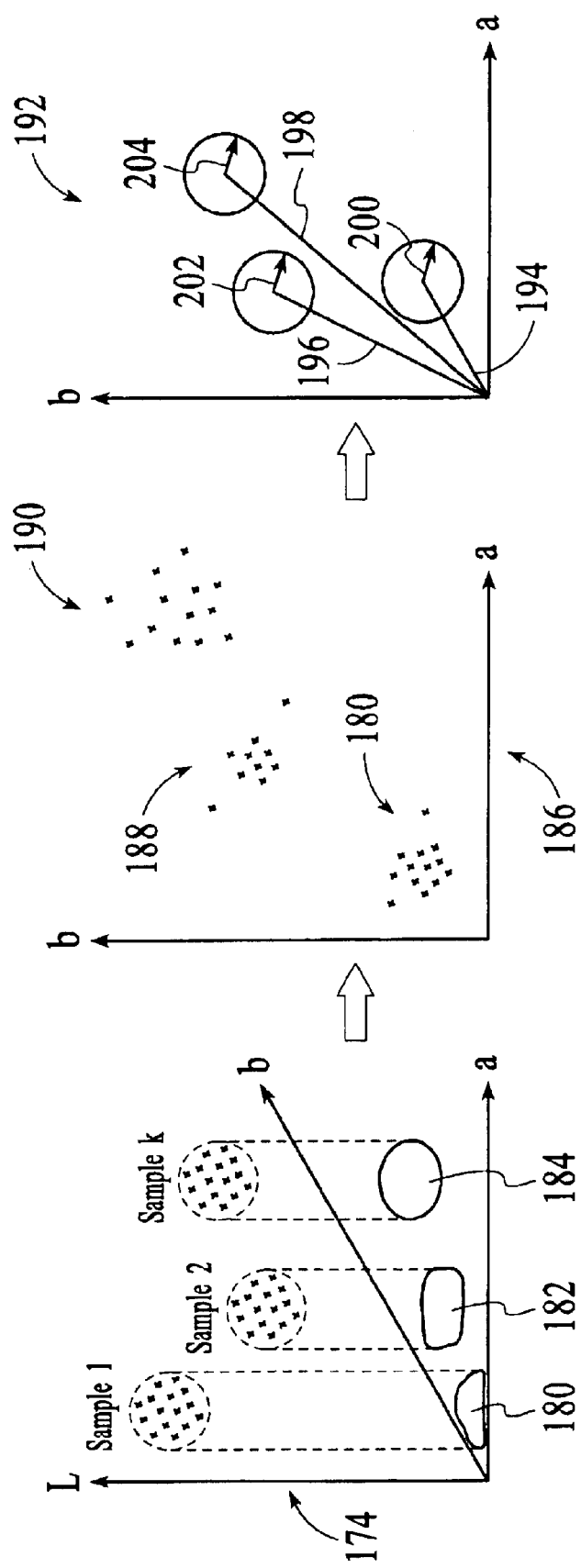
FIG. 8 illustrates the process of clustering, and the process of converting from 3 dimensional LAB space to two dimensional LAB space by eliminating the luminance coordinate.
Figure 9:
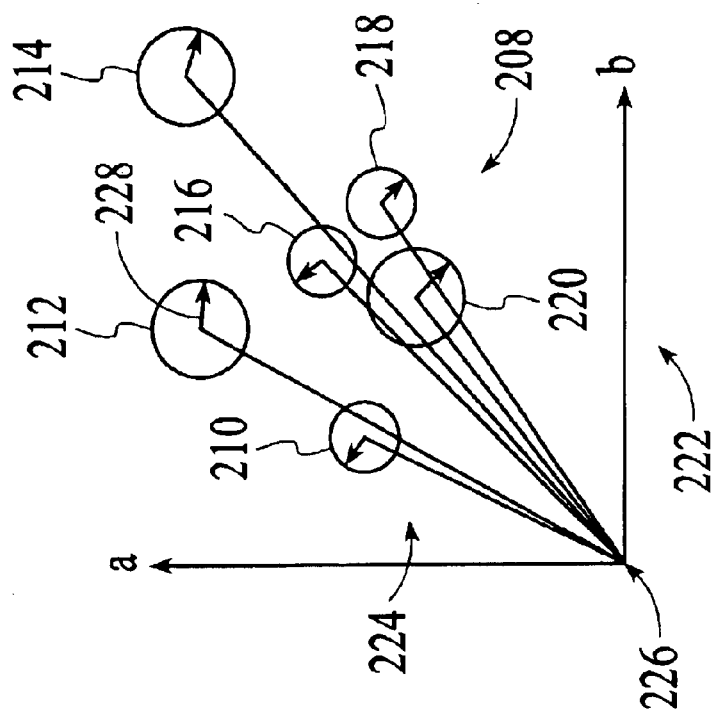
FIG. 9 illustrates the process of clustering initial color prototype values to determine a reduced number of final prototype values.
Figure 9:
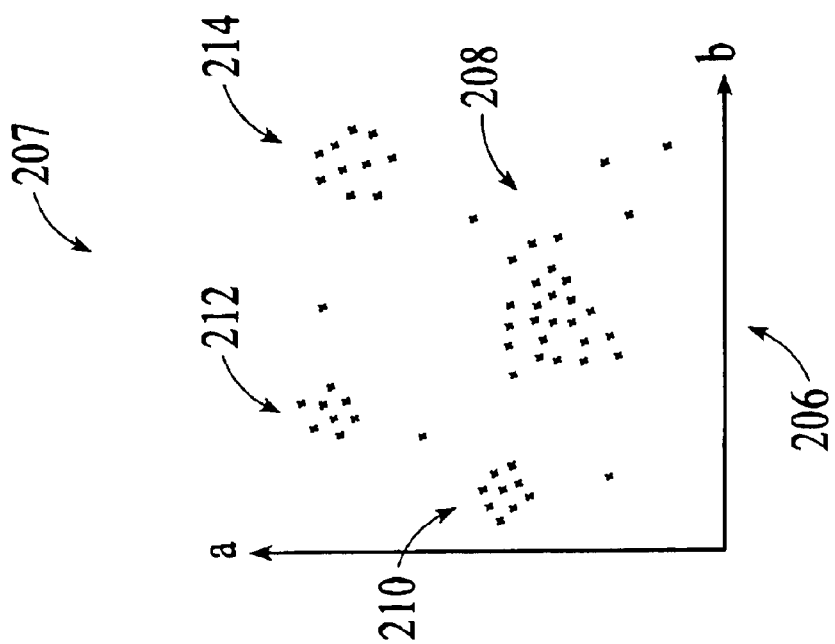

FIG. 8 illustrates the exclusion of the luminance "L" coordinate of the LAB color space 174 of FIG. 7. The luminance value is not needed in order to define color, and eliminating the luminance coordinate results in a two dimensional color space, which significantly increases the speed of processing the color data. The three dimensional LAB space 174 is shown on the left in FIG. 8, and illustrates the projections 180, 182 and 184 of the three dimensional pixel color values of three samples 1, 2 and k onto the two dimensional a–b color plane. The a–b color plane is shown at 186 without the third "luminance" (L) coordinate, showing points representing a–b plain projection pixel values for samples 1, 2 and k, noted as items 186, 188 and 190 respectively. Each of the three representative groups of pixels representing three skin samples can be represented by a center vector value and a radius defining a circular area. Such a representation greatly simplifies calculations and is known as "clustering". A number of different methods of "clustering" data points in other applications are well known in the various arts, including a clustering method known as the "fuzzy-C means" algorithm. The application of the Fuzzy-C means algorithm to clustering the pixel data is the preferred method in the present invention. Other clustering methods are also included in the spirit of the present invention. An advantage of the Fuzzy-C means algorithm is that it allows a more accurate color cluster description when pixels of adjacent samples overlap i.e. when a pixel is a member of more than one sampled skin area. The Fuzzy-C means algorithm allows a pixel color to have a percentage membership in a particular sample. For example, a pixel could have a 20% membership in a sample A, 50% in a sample B, and 30% in a sample C. The result of clustering the three samples 1, 2 and k is shown at 192.

Each cluster 186, 188 and 190 is represented by a center value indicated by vectors 194, 196 and 198 respectively. The area of each cluster 186, 188 and 190 as represented by a radius 200, 202 and 204 respectively. Therefore, instead of having to deal with values for each of a plurality of pixel colors for each skin sample, each sample is represented by a center value and a radius. This greatly accelerates the calculations involved in comparing a pixel from a questionable image with a prototype color sample i.e., the process of color detection as illustrated in FIG. 4. The clustering described above is referred to as block 98 in FIG. 3. Block 100 of FIG. 3 is the process of adding the two dimensional color values in LAB space to the prototype color database. A preferred embodiment of the present invention enters only the center values of each cluster i.e., for example vectors 194, 196 and 198 of FIG. 8. A constant radius value is then used to delineate each cluster, having the key advantage of speed. In the preferred embodiment a radius value of 4.0 provides an optimum value. However, in an alternative embodiment of the present invention that is not speed-critical it would be possible to obtain more exact detection by varying the radius of the cluster associated with each color prototype.

According to the description of the method of FIG. 3, each image is processed as explained above. When all the color prototype data of all the images have been processed as explained above for blocks 94–100 of FIG. 3, the result will generally be a large number of color values in the database. For example, if the database of objectionable images contains 200 images, and if 10 samples are taken from each image, a total of 2000 color prototypes will be placed in the prototype database. This is a large number, and would result in a large amount of processing time to compare color values from a questionable image with all of the 2000 color prototypes. In order to reduce the number of prototype values, a second clustering procedure is implemented, arranging the initial/first color prototype types discussed above into groups according to the procedure of block 110 of FIG. 3. This process is similar to the clustering of the pixels in a sample described above in reference to FIG. 7 for determination of the initial/first color prototype values. FIG. 8 illustrates the process of block 110 for clustering the prototype values to obtain a small number of "final" prototypes.

A two dimensional LAB coordinate system (space) 206 includes a number of points 207 symbolically representing the color prototype values. The Fuzzy-C-means algorithm is, again, the preferred algorithm for "clustering" the points. It is clear that there are at least four obvious groups of color data 208, 210, 212 and 214. In addition, the group 208 can be broken down into overlapping groups 216, 218 and 220. These groups after "clustering" are shown in coordinate system 222. Each of the groups has a center value represented by vectors 224 from the origin 226, and an area represented by a radius such as 228 of group 212. Any number of groups can be specified i.e., the grouping can be of either very fine distinction or very coarse. A preferred number of groups/final prototypes is in the range of 16 to 64 with a most preferred number of 32. The above preferred numbers result in a rapid image evaluation with an adequate degree of accuracy. Other numbers are also included in the present invention.

With the final color prototypes determined, the method of the present invention provides for analyzing a questionable image to determine if it contains skin by comparing it with the final color prototypes. This process was discussed in reference to item 12 of FIG. 1, and in reference to FIG. 4. The process of FIG. 4 will now be further described in reference to FIGS. 10–12.

Figure 10:
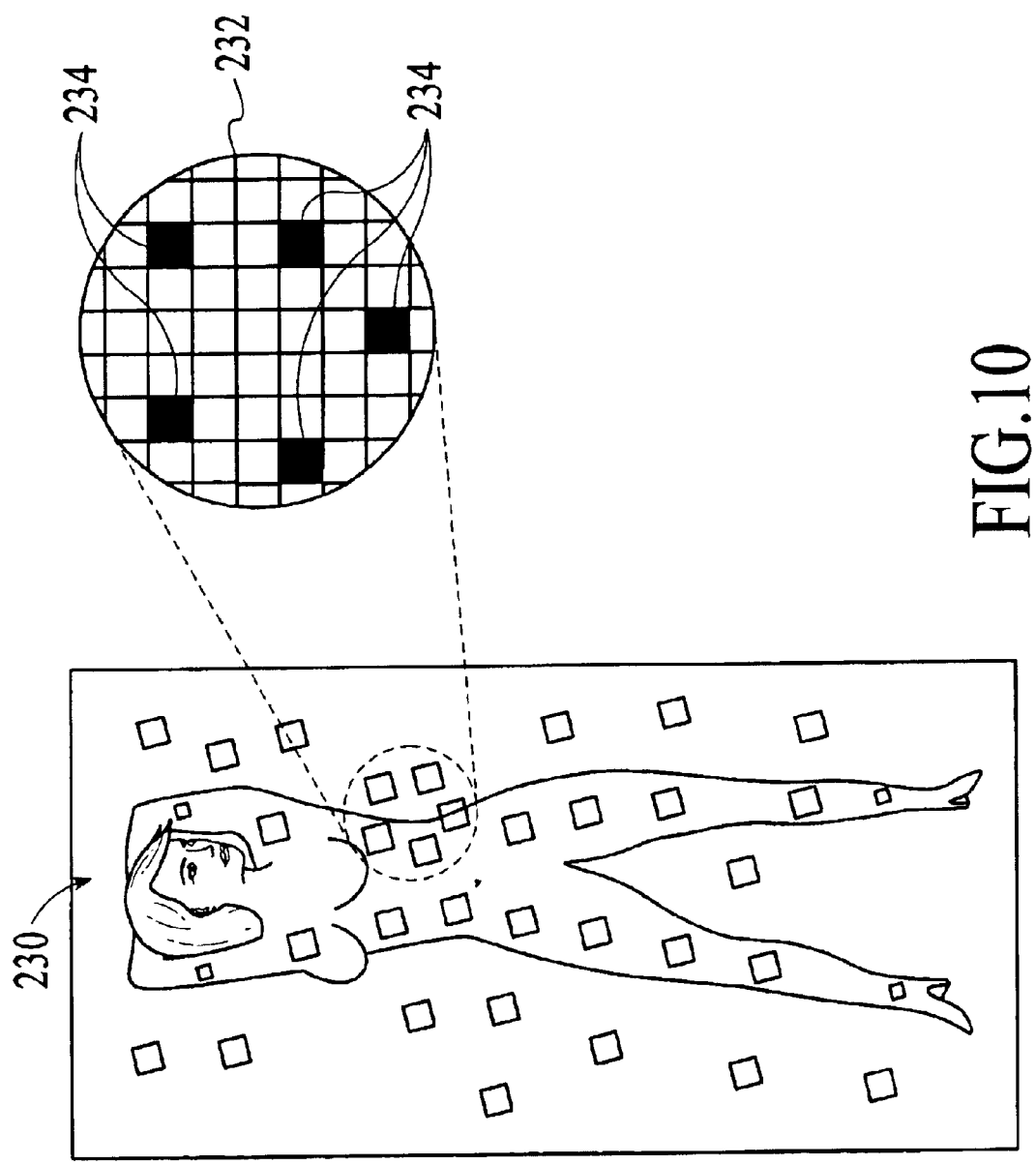
FIG. 10 illustrates sampling a percentage of pixels from a questionable image.
Figure 11:
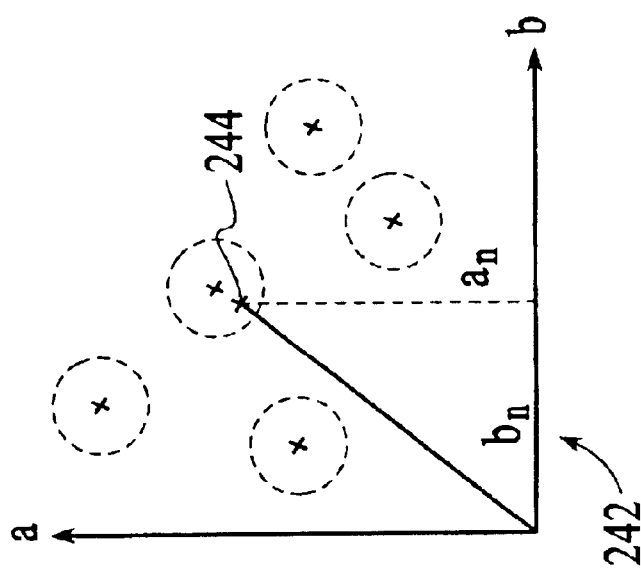
FIG. 11 shows final prototype areas mapped onto two dimensional space with pixels from a questionable image lying inside and outside of the final prototype areas.
Figure 11:
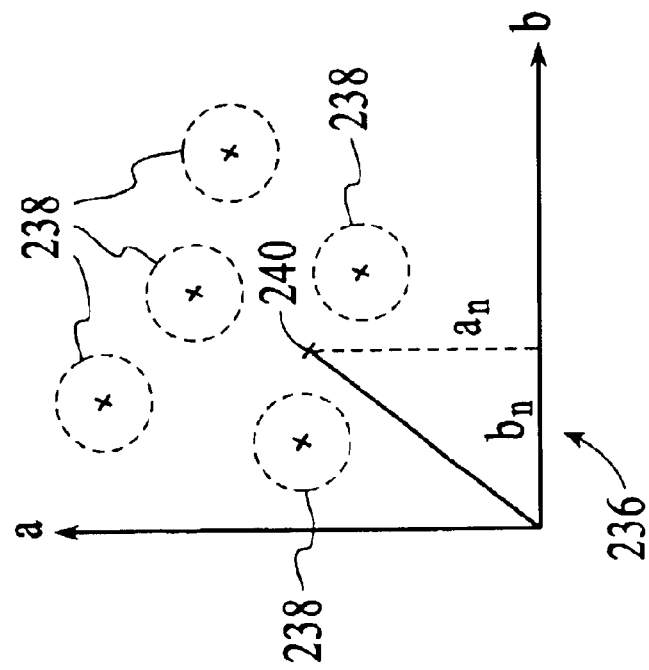

FIG. 10 illustrates an image 230 as discussed in reference to block 112 of FIG. 4. The enlargened illustration 232 shows pixels 234 selected at random from the image 230 as described above in reference to block 114 of FIG. 4. The pixels 234 are received as data in RGB color space. These are then converted to the two dimensional LAB color space in a manner similar to that described above in reference to FIG. 3. This conversion is indicated by block 116 in FIG. 4. FIG. 11 shows a two dimensional LAB coordinate system 236 with final color prototypes 238 superimposed. A pixel 240 from a questionable image is shown plotted on the coordinate system 236. The method compares the color coordinates of the pixel in question with the coordinates of the prototypes 238, and if it lies within one of the prototype areas, the pixel 240 is classed as skin. If it lies outside the areas 238, as does the point 240 displayed, it is not considered skin. Actual computerized processes for comparing values are well known in the computer art and need not be described herein. A coordinate system 242 is shown with final prototype values overlayed, and with a pixel 244 from a questionable image lying within the area of a final prototype. Pixel 244 is therefore classed as a potential skin color.

When a pixel is found to be within a final prototype area, a texture analysis is done in order to distinguish a skin pixel from the same color found in unevenly textured regions, such as a desert, trees, wallpaper, etc. The texture analysis involves evaluation of an area surrounding the pixel in question. For example, a 7×7 pixel area can be examined/analyzed. Any size area is included in the spirit of the present invention. Further, note that the variance of the surrounding pixels is used as a measure of skin texture in the preferred embodiment. Other techniques of texture measurement will be apparent to those skilled in the art, and these are also included in the spirit of the present invention. Examples of other techniques of texture measurement known to those skilled in the art include co-occurrence, Gabor filtering, and Fourier Transform based techniques. These may equally well be applied to the area surrounding the suspect pixel as a means of determining skin texture.

Figure 12:
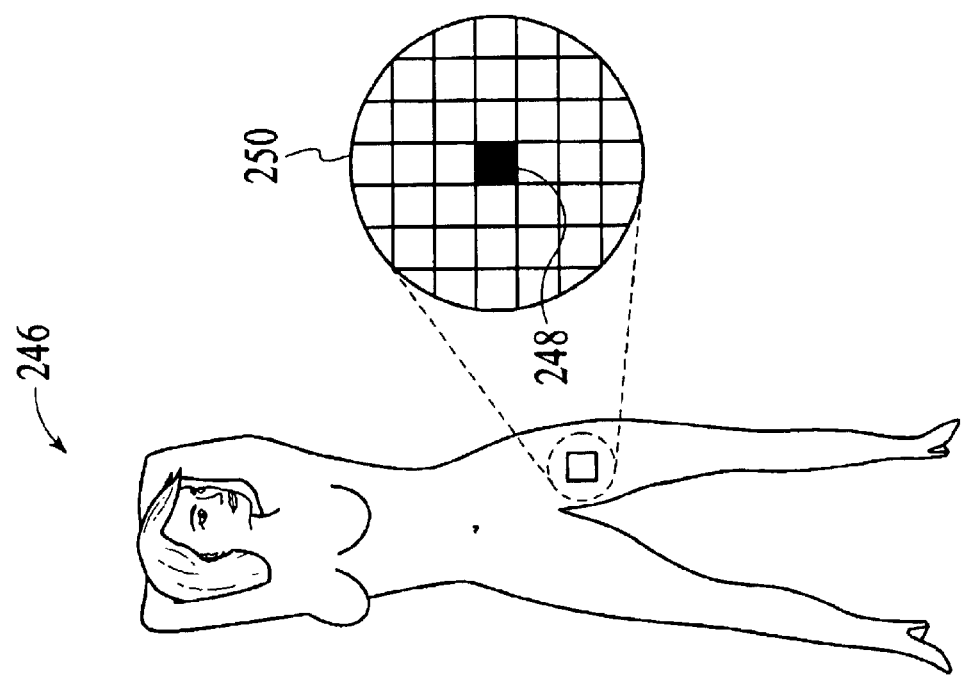
FIG. 12 illustrates the process of texturing.

The texture analysis is accomplished by computing the difference in color (variance) between the pixels in an area 250 surrounding a pixel 248. If the variance is greater than a pre-set value, the area 250 is not considered skin. This is illustrated in FIG. 12 showing an image 246 with a pixel 248 of interest within a surrounding area 250. An equation for the variance "V" is illustrated in FIG. 12.

The term "colour" is an indication of the difference in color between a particular one of P pixels in area 250 and the mean pixel colour value, and is more exactly described as $$\text{colour}^2 = (L - \text{mean } L)^2 + (a - \text{mean } a)^2 + (b - \text{mean } b)^2$$

L, a and b are the LAB color space coordinate values for a particular one of the quantity of P pixels in the area 250 surrounding the pixel 248. Mean L, mean a and mean b are the mean LAB color values of the pixels in the area 250.

A threshold value of variance is selected. The value is somewhat arbitrary. If it is too large, a lot of "landscape" etc. images will be judged as skin. If it is too small, some skin will be judged as landscape. A variance threshold value between 5 and 15 is preferred, with a more preferred value of 10. The above texture discussion applies to blocks 122–124 of FIG. 4 and associated text. Blocks 128 and 130 of FIG. 4 specify a "badness" number before an image is considered skin. In other words, a certain percentage of the pixels need to be found to be skin color in order for the image to be judged as including skin for the purpose of labeling the images potentially objectionable. After sampling all of the pixels specified, such as 10% of the image pixels, a badness number (a percentage) is calculated as the number of bad pixels divided by the number of sampled pixels times 100.

$$\text{Image badness \%} = \frac{\text{No. of bad pixels} \times 100}{\text{No. of sample pixels}}$$

An image badness in the range of 10 to 30% is preferably considered objectionable. For skin detection, a badness of 18% is most preferred. By reducing the percentage to 10% a greater number of "objectionable" images are detected, but with many more false alarms. At 30% very few non-objectionable images will be selected as objectionable, but at the expense of having a greater number of objectionable images pass through the system undetected.

Figure 13:
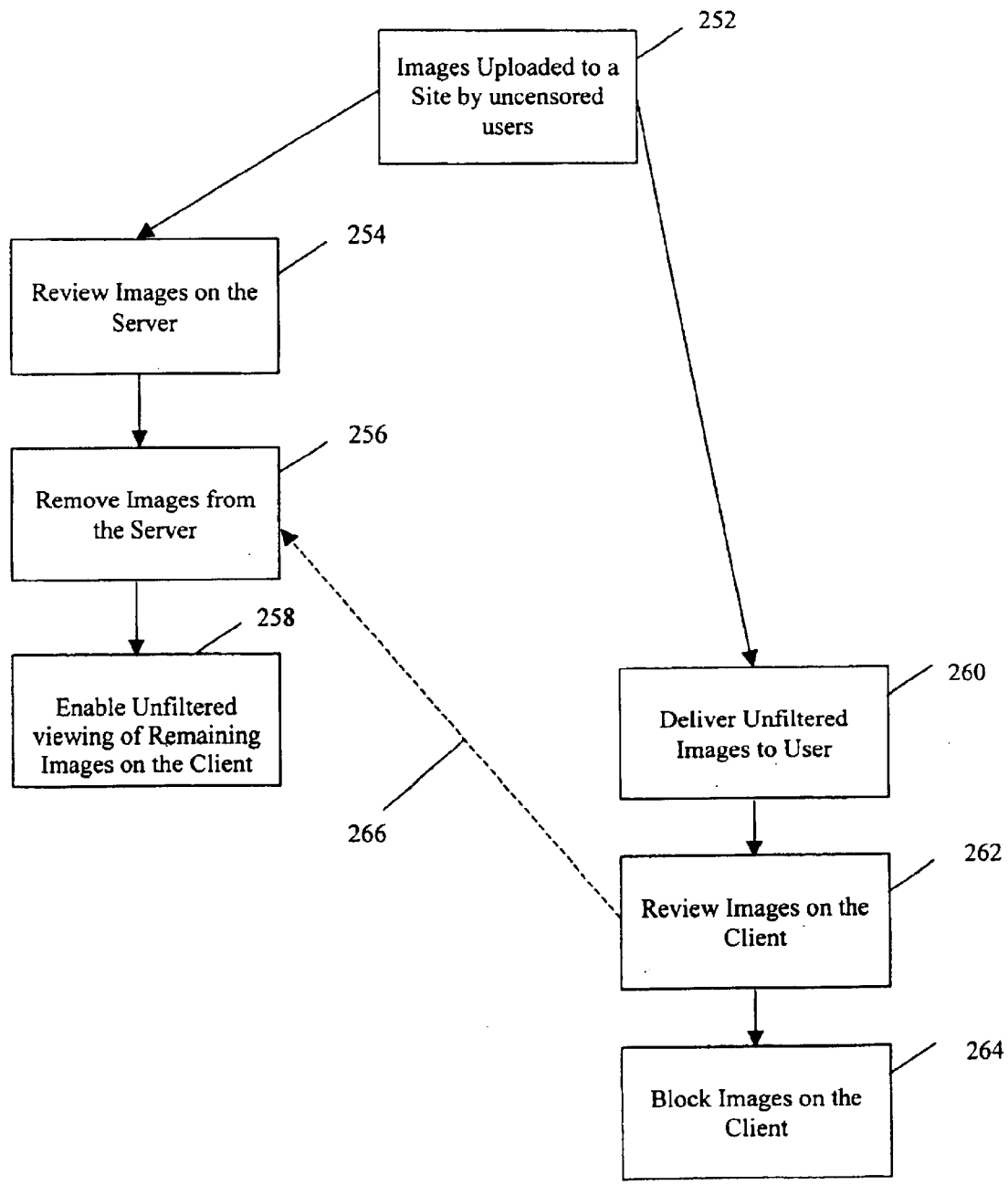
FIG. 13 illustrates the process of integrating the present invention into a client-server Internet site.

FIG. 13 describes two possible integrations of the present invention into a client-server based Internet web site. In one method, indicated by blocks 254, 256 and 258, the unfiltered images are received at a site according to the step of block 252. The images are then evaluated/reviewed (block 254) by the server that is programmed to identify the objectionable images as described above in the present disclosure. The objectionable images are then rendered inaccessible as explained above, or otherwise flagged/tagged with a notice such as "parental guidance", etc. (block 256). The method then allows the remaining acceptable images to be viewed (block 258).

In another method, the images are reviewed and processed on a client based user machine. Block 260 describes the delivery of the images to a user computer. According to block 262, the user computer reviews the images and identifies objectionable images. The objectionable images can then be removed/blocked from access on the user/client machine (block 264).

A further alternate embodiment sends the image identification accomplished at the user computer to the server, as indicated by line 266. The objectionable images are then removed by the server (block 256), and the remaining images are allowed for viewing (block 258).

The different implementations may be used depending on different needs. For a dedicated Web site, a server based application may be preferable. However, to protect users regardless of the server, a client based application to be for example integrated into the Browser on a personal computer is the preferred method.

Although the present invention has been described above in terms of a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A method for use in detecting a pornographic image comprising:
   analyzing a questionable image, said analyzing including
   (a) preparing a final color prototype database having a plurality of final color prototype values, said final color prototype database prepared from selected skin image samples from a plurality of images;
   (b) filtering a questionable image, said filtering including
      (i) comparing a color of a questionable pixel from a questionable image with said final color prototype values;
      (ii) performing a texture analysis on an area surrounding said questionable pixel if said color of said questionable pixel matches a color of a final color prototype, wherein said texture analysis determines a variance in color between said questionable pixel and a color of pixels in said area; and
      (iii) classifying said pixel as a potential skin pixel if said texture analysis indicates that said area has a skin texture.

2. A method as recited in claim 1 further comprising
   (a) preparing a shape prototype database including a plurality of prototype image shapes; and
   (b) wherein said filtering further includes
      (i) comparing a shape of a questionable image including a said potential skin pixel with a said prototype image shape; and
      (ii) classifying said questionable image including said potential skin pixel as an objectionable image if a shape of said questionable image corresponds to a shape of a said prototype image shape.

3. A method as recited in claim 2 wherein said shape prototype database includes a plurality of distinct shape databases wherein each said distinct shape database is for use in detecting a particular shape category.

4. A method as recited in claim 3 wherein a first said distinct shape database is for use in detecting a face.

5. A method as recited in claim 3 wherein a first said distinct shape database is for use in detecting a specified body part.

6. A method as recited in claim 5 wherein said body part is genitalia.

7. A method as recited in claim 5 wherein a second said distinct shape database is for use in detecting an erotic position.

8. A method as recited in claim 1 wherein said final color prototype database includes a plurality of distinct color databases, with each said distinct color database for use in detecting a particular color type.

9. A method as recited in claim 8 wherein a first said distinct color database is configured for detecting at least one of plurality of skin colors.

10. A method as recited in claim 1 further comprising blocking said questionable image in real time from being displayed on a display system if said questionable pixel is determined to be a potential skin pixel.

11. A method as recited in claim 10 wherein said filtering is performed on a server, and said filtering is done prior to a display of said image on said display system.

12. A method as recited in claim 10 wherein said filtering is performed on a user computer.

13. A method as recited in claim 12 wherein said classifying includes preparing classification data indicating if a questionable image is determined to contain skin.

14. A method as recited in claim 13 wherein said classification data is sent from said user computer to a server.

15. A method as recited in claim 1 wherein said questionable image is one of a collection of images of digital video.

16. A method as recited in claim 1 wherein said texture analysis includes determining a variance in color in said area surrounding said questionable pixel.

17. A method as recited in claim 1 wherein said texture analysis includes determining a co-occurrence.

18. A method as recited in claim 1 wherein said texture analysis including Gabor filtering.

19. A method as recited in claim 1 wherein said texture analysis including a Fourier Transform based technique.

20. A method as recited in claim 1 wherein each said color prototype is described in a projection of a three dimensional Luminance-Chrominance space into a two dimensional chrominance space.

21. A method as recited in claim 20 wherein each said color prototype is a clusterized group of groups of pixels represented by a center value and a an ellipse defining an area of said clusterized group.

22. A method as recited in claim 21 wherein said clusterized group is prepared using a fuzzy-C-means algorithm.

* * * * *